US008655673B2

(12) United States Patent
Zhang

(10) Patent No.: US 8,655,673 B2
(45) Date of Patent: Feb. 18, 2014

(54) MOBILE MULTI-MEDIA INTELLIGENT TOURIST GUIDE SERVICE SYSTEM AND ITS REALIZING METHOD

(76) Inventor: Yu Zhang, Beijing (CN)

( * ) Notice: Subject to any disclaimer, the term of this patent is extended or adjusted under 35 U.S.C. 154(b) by 422 days.

(21) Appl. No.: 11/897,992

(22) Filed: Aug. 31, 2007

(65) Prior Publication Data
US 2008/0059222 A1 Mar. 6, 2008

(30) Foreign Application Priority Data

Sep. 1, 2006 (CN) .......................... 2006 1 0112317

(51) Int. Cl.
*G06Q 10/00* (2012.01)
*G06F 15/16* (2006.01)

(52) U.S. Cl.
USPC ........................................... 705/1.1; 709/217

(58) Field of Classification Search
None
See application file for complete search history.

(56) References Cited

U.S. PATENT DOCUMENTS

| 6,360,167 | B1 * | 3/2002 | Millington et al. ........... 701/211 |
| 2002/0011951 | A1 | 1/2002 | Pepin et al. |
| 2003/0009281 | A1 * | 1/2003 | Whitham ..................... 701/211 |
| 2005/0192025 | A1 | 9/2005 | Kaplan |

FOREIGN PATENT DOCUMENTS

| CN | 1350373 | 5/2002 |
| CN | 1350373 | 7/2002 |

OTHER PUBLICATIONS

O'Grady, M.J.; O'Hare, G.M.P.; "Just in time multimedia distribution in a mobile computing environment," Multimedia, IEEE , vol. 11, No. 4, pp. 62-74, Oct.-Dec. 2004.*
O'Grady, M.J.; O'Hare, G.M.P.; , "Just in time multimedia distribution in a mobile computing environment," Multimedia, IEEE , vol. 11, No. 4, pp. 62-74, Oct.-Dec. 2004 URL: http://ieeexplore.ieee.org/stamp/stamp.jsp?tp=&arnumber=1343832&isnumber=29587.*
Lorenz, Andreas, Andreas Zimmermann, and Markus Eisenhauer. "Enabling Natural Interaction by Approaching Objects." (2005).*

* cited by examiner

*Primary Examiner* — Jonathan Ouellette
*Assistant Examiner* — Maame Ofori-Awuah
(74) *Attorney, Agent, or Firm* — Workman Nydegger

(57) ABSTRACT

The present invention discloses a mobile multi-media intelligent tourist guide service system, comprising GPS positioning receiver, GPS subsystem, mobile tourist guide service control subsystem, trigger area network subsystem, tourist guide information intelligent selecting and compositing subsystem, multi-media managing display subsystem, and electronic map subsystem. The mobile tourist guide service control subsystem receives and processes position information from the GPS positioning subsystem, produces multi-media tourist guide information in real-time through trigger area network subsystem and a tourist guide information intelligent selecting and compositing subsystem, plays on said multi-media managing display subsystem, and controls said electronic map subsystem displaying position in real-time, recording track and displaying corresponding geography information.

9 Claims, 2 Drawing Sheets

MOBILE MULTI-MEDIA INTELLIGENT TOURIST GUIDE SERVICE SYSTEM AND ITS REALIZING METHOD

BACKGROUND OF THE PRESENT INVENTION

1. Field of Invention

The present invention relates to a tourist guiding system and method, and more particularly, relates to a mobile multi-media intelligent tourist guide service system and its method.

2. Description of Related Arts

Traditionally, the tourists are serviced by local guiding personnel in traveling destinations. However, as the time advanced, it is witnessed that sciences and technologies had achieved significant progress in all aspects. A variety of innovative terms and concepts, such as globalization, information technology, digitalization, telecommunication revolution and so on had thoroughly re-shaped our thoughts and routine activities. So there is no exception in traveling industry. The traditional limited personal service would never meet such changing surge in information age. Modern tourists are expecting a kind of higher standard, but individualized guiding service in traveling destinations.

As a result, it is witnessed that a variety of electrical guiding systems have been developed in certain places to replace traditional manual guiding services. Most of the cases, such system would utilize different emitting means, such as wireless, infrared rays, and RF (radiology frequency), and relevant receiving means to transmit detailed guiding information so as to electrically guide tourists in destination.

For instance, there is a kind of induction electrical guiding device introduced into the market, wherein such device comprises a predetermined mode map for the tour site, a wireless positioning induction system, and a tape-recording guide service. In spite of such device could provide a sort of automatic guiding service, its drawbacks are also obvious. First of all, considerable hardware would be prerequisite. At least one wireless emitter has to be erected within the tour site. Due to the fact such wireless emitter would be costly and vulnerable to be interrupted by other wireless emitting means, the prevalence of such device would be rather limited.

It is noted that a Chinese patent application, numbered as CN00130764.9, had disclosed a kind of potable tourist audio auto-playing system, which utilizes GPS coordinate data as sight message trigger switch to provide tourists instant data. Notably, such GPS system would not rely on limited hardware anymore. However, an archilles' heel of such device would be same with the above-mentioned wireless, infrared ray, and RF guiding means. I.e., the trigger procedure was simple, and triggering occasions and places single. In other words, the triggered information is simply formalistic and short of versatility. There is no artificial intelligence devices had been equipped by such devices. The customer is not able to personally select the guiding mode, nor choose dynamic interface to obtain advanced information.

SUMMARY OF THE PRESENT INVENTION

A primary object of the present invention is to provide a mobile multi-media intelligent tourist guide service system and its realizing method for guiding a tourist through portable intelligence multi-media means, wherein such device is capable of overcoming above mentioned drawbacks of the traditional guiding devices.

Another object of the present invention is to provide a mobile multi-media intelligent tourist guide service system, which utilizes GPS system as a guiding platform to provide the user a thorough service regardless of the position and status.

Another object of the present invention is to provide a mobile multi-media intelligent tourist guide service system, which is solely dependent onto the GPS system. Therefore, there are no supplemental equipments or devices would be required for achieving the above mentioned objects.

Another object of the present invention is to provide an electrical guiding system, which is capable of enormously expanding the service range, geographically and knowledgably. In other words, the guiding system of the present invention will alter traditional guiding service concept, and is purposed to provide a user guiding service in all aspect, not limited to geographical boundary and motion status. The user will enjoy the service while driving on the road, relaxing in countryside, as well as sailing in Deep Ocean.

Another object of the present invention is to provide an electrical guiding system, wherein the data or information triggering means are reliable, prompted, and selective to the user. Moreover, the received data could be automatically and intelligently generated.

Another object of the present invention is to provide an electrical guiding system, wherein the multimedia technology is implemented into the system to strengthen the conventional audio-only guiding means.

Accordingly, to achieve the above-mentioned objects, the present invention provides a portable multimedia intelligent guiding system, comprising a mobile multi-media intelligent tourist guide service system, comprising: a GPS receiver, a GPS positioning receiver, a multi-media managing display subsystem, and an electronic map subsystem, wherein the system further comprises a mobile tourist guide service control subsystem, a trigger area network subsystem, and a tourist guide information intelligent selecting and compositing subsystem.

The mobile tourist guide service control subsystem receives and processes position information from the GPS positioning subsystem, produces multi-media tourist guide information in real-time through trigger area network subsystem and a tourist guide information intelligent selecting and compositing subsystem, plays on said multi-media managing display subsystem, and controls said electronic map subsystem displaying position in real-time, recording track and displaying corresponding geography information.

The trigger area network subsystem sets up trigger area network, and deploys tourist guide information in the trigger area network according to the scenery environment and the tourism order.

The tourist guide information intelligent selecting and compositing subsystem control to select and composite multi-media tourist guide information according to the tourist behavior.

The tourist guide information intelligent selecting and compositing subsystem uses status property and process property to judge, select and composite the multi-media tourist guide information.

The multi-media managing display subsystem is used for playing audio, video, and literal files.

The trigger area network subsystem coordinates the real scenery, explanation and eyesight according to the trigger area of trigger network with different position, size, shape, and number.

The trigger area network subsystem identies the multi-media tourist guide information through the information type, language, nation, city, area, and title of the tourist guide information.

The process property is used for tracking the tourist visiting process, comprising priority judge, non-repeat judge, exclusive judge, and dependence judge, wherein said process property has "and" and "or" relationships in between.

The status property is used for checking the tourist status, comprising position status judge, velocity judge, moving direction judge, road side judge, and present time.

A method of mobile multi-media intelligent tourist guide service, comprising:

a) profiling the trigger area through trigger area network subsystem according to the human geography environment of the scenery;

b) forming the trigger area network in all trigger area;

c) deploying the tourist information unit according to the possible tourist order in the trigger area network;

d) receiving the real-time position signal through the GPS positioning subsystem from the global positioning satellite;

e) transferring the position signal to the present real-time position coordinate and recording to the historical position coordinate aggregate;

f) extracting tourist guide information unit aggregate from the scenery information database through trigger area network subsystem, and utilizing trigger area network based on real-time coordinate;

g) selectively compositing the tourist guide information unit aggregate, and producing real-time multi-media tourist guide information through the multi-media information intelligent control selecting and compositing switch of the tourist guide information intelligent selecting and compositing system;

h) transferring the multi-media tourist guide information to the audio and video signal to play for the user by the multi-media managing display subsystem.

In the tourism process, the system repeats the step d) to h).

The method of mobile multi-media intelligent tourist guide service, after step f, further comprises a step of calculating the current moving status according to the present real-time position coordinate and historical position coordinate aggregate through tourist information intelligent selecting and compositing subsystem;

The method of mobile multi-media intelligent tourist guide service, after step f, further comprises a step of calculating, producing and storing a process according to the historical trigger result and status through tourist information intelligent selecting and compositing subsystem;

These and other objectives, features, and advantages of the present invention will become apparent from the following detailed description, the accompanying drawings, and the appended claims.

DETAILED DESCRIPTION OF THE PREFERRED EMBODIMENT

The present invention is further illustrated as follows.

Based on GPS, GIS (electronic map), imbedded software system, voice composition, multi-media display, and so on, the present invention inventively combines with traditional tourist service forming a electronic tourist guide service system which can replace human beings.

Figure 1:
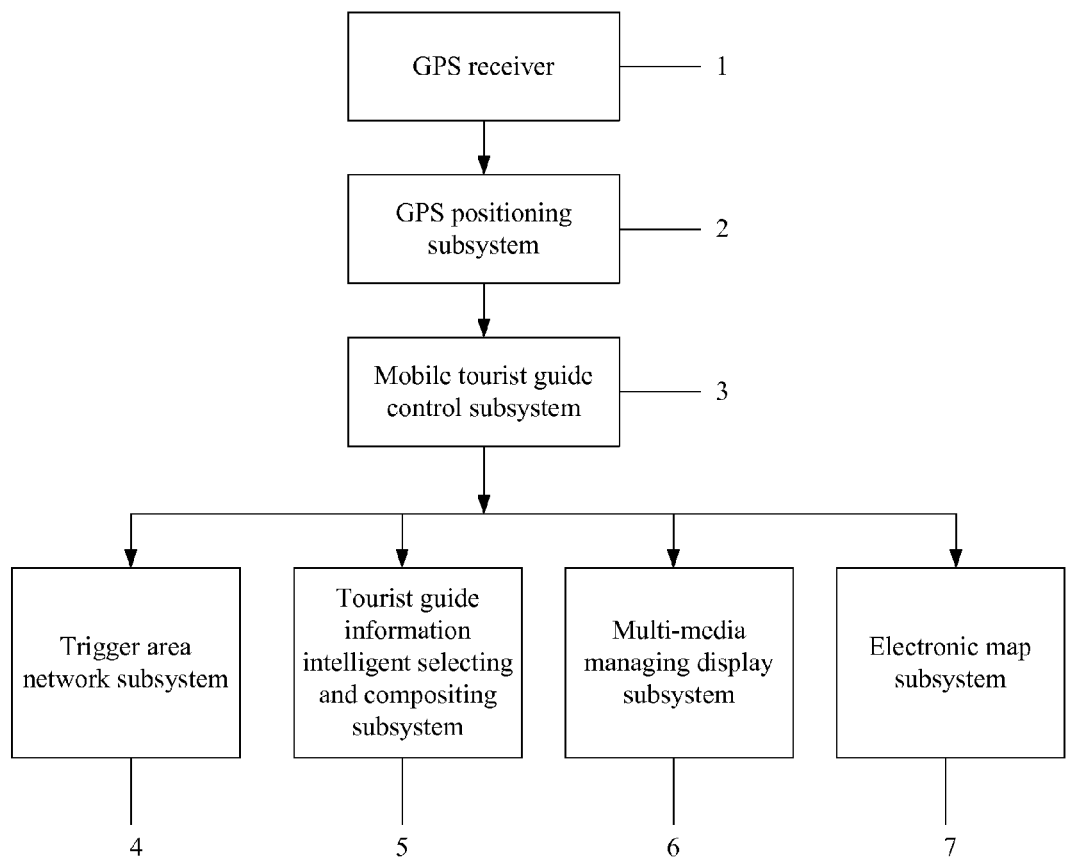
FIG. 1 is a system diagram illustrating a mobile multi-media intelligent tourist guide service system according to a preferred embodiment of the present invention.

Referring to FIG. 1 of the drawings, the present invention comprises GPS positioning receiver 1, GPS subsystem 2, mobile tourist guide service control subsystem 3, trigger area network subsystem 4, tourist guide information intelligent selecting and compositing subsystem 5, multi-media managing display subsystem 6, and electronic map subsystem 7.

Wherein the GPS positioning receiver 1 receives the positioning signal from GPS, and transmits to the GPS subsystem 2;

the GPS subsystem 2 receives the signal from the positioning receiver 1 and transmits to the mobile tourist guide service control subsystem 3;

the multi-media managing display subsystem 6 is used for play corresponding video, vocal or image;

the electronic map subsystem 7 is used for display electronic map, display user's position, record the user's track, and display the geography information of user's position.

The system creates unique mobile tourist guide service control subsystem 3, trigger area network subsystem 4, and tourist guide information intelligent selecting and compositing subsystem 5 to obviously enlarge the tourist guide service range, improve the intelligent degree, and increase tourist guide services.

Now, the technique theory of the mobile tourist guide service control subsystem 3, trigger area network subsystem 4, and tourist guide information intelligent selecting and compositing subsystem 5 are explained as below.

1. The trigger area network subsystem 4 is to ensure that the GPS positioning signal triggers the necessary technique system corresponding to tourist guide multi-media at the best time and best location. It comprises profiling the trigger area, set up trigger area network, and attaches the large number of the multi-media information to the area network.

(1) Profiling the Trigger Area

Profiling the trigger area is to profile the trigger area on the electronic map. Any point in the area that is sensitive to the GPS geography data signal can trigger the information in this area, so called trigger area. By controlling the trigger position, size, shape and number, ensure that the tourist eyesight and the explanation are constant to the real sight, so as to achieve the intelligent effect of the tourist guide system, which produce a feeling that the tourist guide system are same as the human being tourist guide.

(a) Position arrangement: not only simply put the trigger area on the corresponding place on the electronic map, but also consider the impact of the landform and the geomorphy on the tourist eyesight; and put the trigger area on the passing route; especially, put the trigger area of the high and large scenery on a far place; for the tourist guide on vehicle, the trigger area should be put on a place several decades meters ahead of the vehicle, so that after a few second, the vehicle arrives, the scenery arrives, and the explanation of the tourist guide arrives too. Thus, the trigger area that can satisfy the requirement on all conditions is qualified trigger area. While triggering, the tourist eyesight, explanation, and real scenery can coordinate together.

(b) The size of the trigger area: the determination of the size of the trigger area is important step. In principle, the size of the trigger area is larger than the real scenery. If the real scenery is high, the trigger area should be much larger than the real scenery. Thus, the tourist can see the scenery when far from the scenery, and listen to the explanation to the scenery. If the detail of the scenery is to be explained, the trigger area should be smaller, for example, the grave and painting of the scenery is to be explained, the trigger area should be close to the scenery.

(c) The shape of the trigger area: the shape of the trigger area also matters. The shape of the trigger area is determined according to the shape, surrounding landform, tourist eyesight angle of the real scenery. The shape can be square, round, triangle, rhombic, trapeziform, anomaly shape and so on. But the shape should only change to ensure that the explanation of the scenery constants to the scenery the tourist sees. For example, when explaining the scenery of the yard, the trigger area should be arranged by the shape of the yard. If the shape is not proper, the tourist can hear the explanation of the scenery, but can not see the scenery.

(d) The number of the trigger area: in principle, one scenery spot comprises one trigger area, but according to the circumstance, on scenery can comprises two or more trigger areas. For example, for one scenery spot having four same side views, only one round or square trigger area around the scenery is needed. No matter which side triggered, the tourist eyesight and the explanation constant to the real scenery. If the scenery spot having four different side views, a reverse trapeziform area can be set around the scenery spot so as to trigger different scenery information. When being triggered, what the tourist listens and sees constants with the scenery.

(2) Set Up Trigger Area Network

Set up trigger area network is to connect and enlarge the different trigger areas with different size, position, shape and number on the electronic map to form a block shape trigger area network. The complex network may be sparese or compact, detached or overlapped. Many trigger areas are connected to be a network forming a scenery zone, a city, a nation, or even a global trigger area network, to ensure the tourist consistency and the extensity.

(3) Put the Tourist Guide Multi-media Information on the Trigger Network:

Put the scenery information on the trigger area network is to connect the identity number of the tourist guide multimedia information to the corresponding trigger area. Each trigger area comprises at least one piece of scenery information. If more than one piece of scenery information is needed, the tourist information intelligent selecting and compositing subsystem may be used to achieve different intelligent effect. The scenery information includes audio, video and other kinds of information. When triggered, a corresponding scenery information identity number is obtained from the trigger area to extract detailed scenery information from the scenery information database.

(4) The Scenery Information Database:

The scenery information database mainly stores and manages the scenery information in form of identity number. The database stores a larger number of scenery information. The scenery information includes multi-media information such as audio, video, literal, picture and so on. The video information includes recorded video, film and so on. The scenery information combines the video and audio information according to the scenery. As the increasing of the scenery spots and areas, for easy management, the following rules for selecting and setting the scenery information identity. The digital identity code of the scenery information is formed according to the different nation, city, scenery area, scenery spot and language type. For example, use nation telephone code as the identity code, use telephone city code as the identity code, use nature series number of the scenery area as the identity code, and use the visit order of the scenery spot as the identity code, all of which combine to the identity code of the scenery. For example, the tourist guide information identity code of the sundial in the TaiHe palace of the Imperial Palace, Beijing, China is 0086-010-001-020-05.

2. The Tourist Guide Information Intelligent Selecting and Compositing Subsystem 5:

The tourist guide information intelligent selecting and compositing subsystem 5 is a technique system to select and composite the different multi-media information in the trigger area according to the variation of the state and process. The system sets up the intelligent selecting and compositing switch database required by the mobile tourist guide service control subsystem.

Intelligent selecting and composting switch is to intelligently control the scenery information of a trigger area. Because each trigger area has a large number scenery information with different contents, forms, different types, to determine which one should be triggered or not triggered, firstly triggered or lastly triggered should select and composite through intelligent selecting and composting switch. The basis of the intelligent selecting and composting switch is firstly the transient state and historical process of the GPS signal when triggered, secondly the predetermined trigger condition of the scenery information in the trigger area; when the state and the process of the GPS signal is constant with the predetermined trigger condition of the scenery information, the scenery information is triggered, and reversely, not triggered. There are two methods to judge the relationship of them. One is process judgment, which the other is status judgment.

(a) Process Judgment

The process judgment is to judge the relationship between the historical process of the received GPS signal and the predefined tense of the scenery information. The process judgment includes priority judgment, exclusive judgment, non-repeat judgment, and dependence judgment.

The priority judgment is to define the sequence of the scenery information triggered. Each scenery spot of a trigger area has its own tense that is priority. The scenery information with high priority is triggered first and the scenery information with low priority is triggered behind. For example, at the door of the Taihe palace, golden dragon seat, dragon well, golden column, golden brick and so on are explained, wherein the golden dragon seat has highest priority, so as to be explained first; the dragon well is next for its second priority; and so on and so forth. The priority can divide the explanation information according to the importance, and each explanation is independent. After one piece of information is completed, the equipment can tell whether the tourist leaves the trigger area, so as to determine whether to stop explanation or keep on.

The exclusive judgment is the first and second scenery information in the different trigger area, and they are defined with exclusive property. When the historical process of the GPS signal shows that the first information has been triggered, and the second will not be triggered. Reversely, the first information has not been triggered, the second will be triggered. For example, the first place is Zhonghe palace in the Imperial Palace, and the second is Taihe palace, if the tourist has not listened to the explanation on the Zhonghe palace, after the explanation on the Taihe palace, indicate the tourist to go to the Zhonghe palace, if the tourist has been to the Zhonghe palace, the indication will not be triggered.

The non-repeat judgment is that the first information is put to the different trigger areas, because the first information is defined with non-repeat, the first information will not be repeated. For example, the first information is triggered in one area, and when the tourist goes to other trigger area having the first information, because the historical process of the received GPS information shows that the first information has been triggered in other trigger area, the first information will not be trigger any more. Likewise, the tourist has not listened to the first information in the first area, and can listen to the first information in other trigger area, so as to avoid repeat. For example, the story of the last empire Puyi ascending the throng happens on both the terrace and the door of the Taihe palace. If the explanation is triggered at one place, it will not repeat at other places.

Dependence judgment is that the first and second information are triggered in the different scenery spots, wherein both of the information is defined with dependence property. If the first information is triggered at one trigger area, in another area, because the received historical GPS information shows that the first information has been triggered, the second information dependent on the first information can only be triggered in this area. For example, the first information is for the Chuxiu palace of the Imperial Palace, and the second information is to indicate the tourist to go to other scenery spot after the Chuxiu palace. The first information is put on the yard of the Chuxiu palace, while the second information is put outside the yard of the Chuxiu palace. The tourist passes the trigger area with second information first, but because the tourist has not listened to the explanation on the Chuxiu palace, the second information will not be triggered. After the tourist listen the explanation on the Chuxiu palace and come out from the Chuxiu palace, the second information is triggered.

The composition of the above judgment determines the trigger time. The composition of judgments comprises "and" and "or" relationships.

The "and" relationship means the several judgments should come into existence at the same time, the explanation can be triggered. The "and" relationship mainly is compositing the dependent judgment and the exclusive judgment. The "and" relationship demands that the first judgment and second judgment come into existence at the same time. For example, the Temple of Heaven has three scenery spots from the north to the south, the first, the second and the third. When the tourist comes to the third, need to tell the tourist it is the last scenery spot on this route. This explanation is correctly triggered for the tourist who has visited the first and second. That is this piece of explanation information depends on the first and second explanation information has been triggered, wherein the two dependent judgments should come into existence at the same time.

The "or" relationship means one of the several judgments should comes into existence, the explanation can be triggered. The "or" relationship mainly is compositing the dependent judgment and the exclusive judgment. The "or" relationship demands that one of the first judgment and second judgment come into existence. For example, after the tourist leaves the east six palaces of the Imperial Palace, need to tell the tourist that the visit of the east six palaces is over. The tourist may not visit the all six palaces due to the time, and at this time, the end statement needs to be determined by the "or" relationship. That is when the tourist leaves east six palaces, the explanation information of any one or several palaces of east six palaces is triggered, the end statement of the east six palaces is triggered.

(b) Status Judgment

The status judgment is to judge the relationship between the transient status of the received GPS signal and the status property defined by the scenery information. The status judgment includes position status judgment, velocity range judgment, moving direction judgment, and road side judgment.

The position status judgment is to define the position status of the scenery information. When the transient status of GPS shows in the trigger area, the information in the trigger area will going on. Once the transient status of GPS shows out of the trigger area, the equipment will intelligently switch off the selecting switch, the all pieces of information in this trigger area have not played, the equipment immediately switch off. This can prevent the equipment from keep talking when the tourist leaves the trigger area.

The velocity range judgment is to define a status property of a highest value and the lowest value of a scenery spot in a trigger area. When the transient status of GPS shows that the tourist moving velocity is between the highest value and the lowest value of the scenery spot, the information of the scenery spot will be triggered. On the contrary, the moving velocity is higher than the highest value and is lower than the lowest value, the information of the scenery spot will not be triggered. At present, this is only suitable for the tourist guide system on vehicle. For example, the scenery spot beside the road is defined with two pieces of scenery information for two moving velocities, one is the scenery information for 10 kilometer/hour walking moving velocity, and the other is the scenery information for 20-60 kilometer/hour vehicle moving velocity. When the GPS signal shows that the transient velocity is 40 kilometer/hour that complies with the later, the scenery information for vehicle moving velocity is triggered; when the GPS signal shows that the transient velocity is 5 kilometer/hour that complies with the first, the scenery information for walking moving velocity is triggered.

The moving direction judgment is to define a moving direction status property of a highest value and the lowest value of a scenery spot in a trigger area. If a highest value and the lowest value of the direction judgment of a piece of scenery information is 45 degree and 135 degree with north zero degree. When the transient status of GPS shows that the tourist moving direction is between the highest value and the lowest value of the scenery spot, the information of the scenery spot will be triggered. On the contrary, the moving direction is higher than the highest value and is lower than the lowest value, the information of the scenery spot will not be triggered. At present, this is only suitable for the tourist guide system on vehicle.

The road side judgment is to determine whether to trigger the information according to the scenery spot on the left side or right side of the vehicle moving direction. The judge needs to set the position of the scenery spot and choose whether to trigger according to the road side. The road side judgment is to judge the scenery spot whether on the right side or left side of the tourist according to the location of the scenery spot and vehicle moving direction. The system determines to trigger according to whether the side of scenery consistent with the explanation. For example, when the vehicle of tourist enters into a trigger area with road side scenery information, and the scenery spot is on the left side of the tourist; at the same time, when the tourist chooses the left side of moving direction explanation, the scenery information is triggered; when the tourist chooses the right side of moving direction explanation, the scenery information is not triggered.

3. Mobile Tourist Guide Service Control Subsystem 3

The mobile tourist guide service control subsystem 3 is to obtain multi-media managing display subsystem by three steps according to the position information provided by the GPS positioning subsystem and using the database based on the trigger network subsystem and tourist information intelligent selecting and compositing subsystem to serve as a tourist guide. The three steps are triggering area network, extracting the multi-media content, and intelligently selecting and compositing.

(1) Triggering Area Network

The multi-media managing display subsystem enquire information of the corresponding trigger area from the trigger area network database, according to the trigger information from the GPS positioning subsystem. When the multi-media managing display subsystem find one or more consistent trigger area, and obtain the multi-media identity information attached on the trigger area from the trigger area network database.

(2) Extracting the Multi-Media Content

This step is to obtain further detailed information form the multi-media information database, according to the multi-media identity information from the trigger area network database.

(3) Intelligently Selecting and Compositing

This step is to selecting and compositing the multi-media information from the multi-media information database, utilizing the intelligent selecting switch database of the tourist information intelligent selecting and composting subsystem, to finally composite the best multi-media content. In this step, mobile tourist service control subsystem judges the process and the status of each multi-media information to determine whether to trigger this information and the trigging order utilizing intelligent selecting switch database.

In the present invention, the GPS receiver 1, GPS positioning subsystem 2, multi-media managing display subsystem 6, and electronic map 7 are prior arts, which are no longer illustrated.

Figure 2:
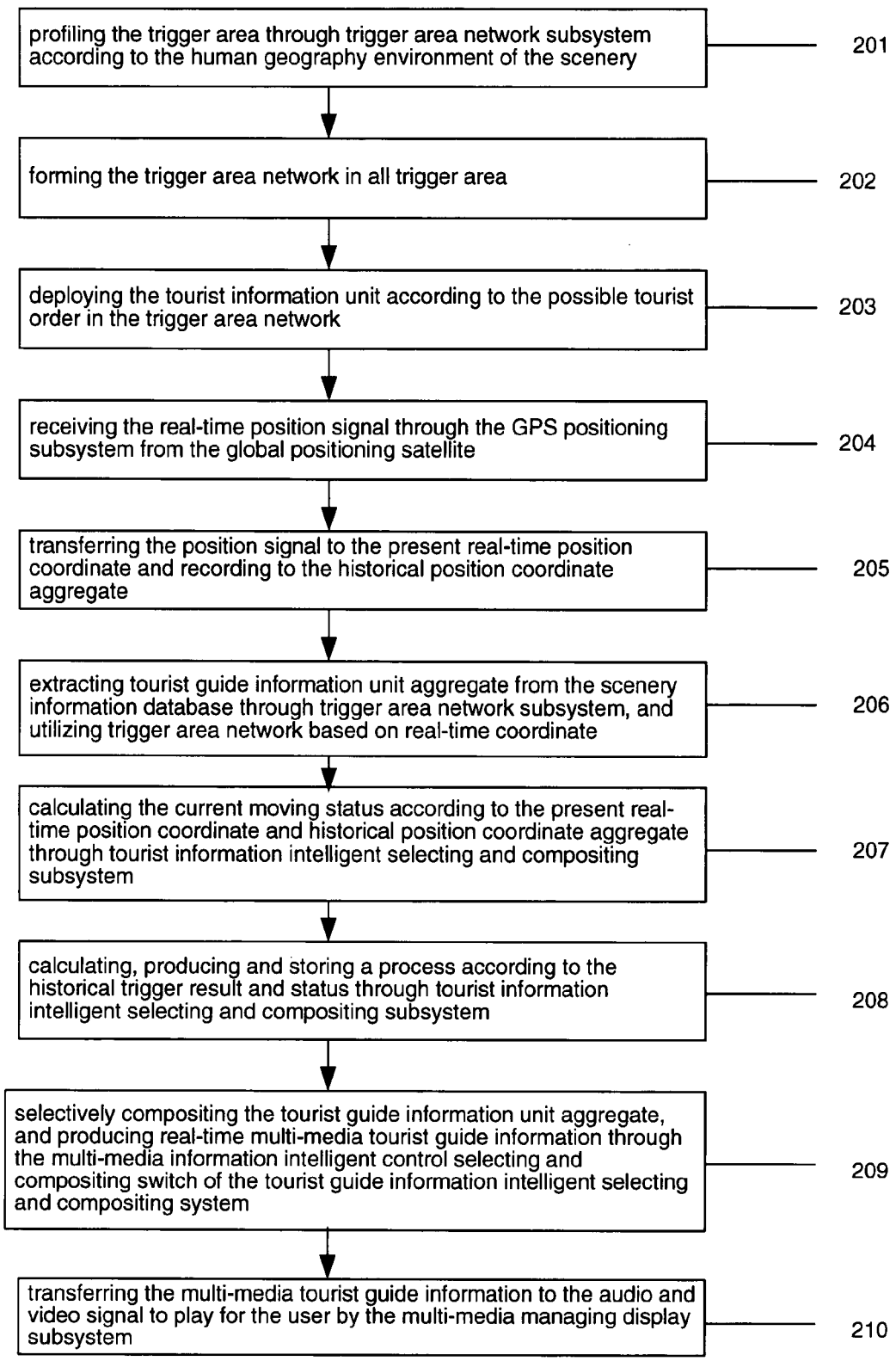
FIG. 2 is a flow chart illustrating a realizing method of a mobile multi-media intelligent tourist guide service system according to the above preferred embodiment of the present invention.

Referring to FIG. 2 of the drawings, the working process of the present invention is as follows.

Step 201, profiling the trigger area through trigger area network subsystem according to the human geography environment of the scenery;

Step 202, forming the trigger area network in all trigger area;

Step 203, deploying the tourist information unit according to the possible tourist order in the trigger area network;

Step 204, receiving the real-time position signal through the GPS positioning subsystem from the global positioning satellite;

Step 205, transferring the position signal to the present real-time position coordinate and recording to the historical position coordinate aggregate;

Step 206, extracting tourist guide information unit aggregate from the scenery information database through trigger area network subsystem, and utilizing trigger area network based on real-time coordinate;

Step 207, calculating the current moving status according to the present real-time position coordinate and historical position coordinate aggregate through tourist information intelligent selecting and compositing subsystem;

Step 208, calculating, producing and storing a process according to the historical trigger result and status through tourist information intelligent selecting and compositing subsystem;

Step 209, selectively compositing the tourist guide information unit aggregate, and producing real-time multi-media tourist guide information through the multi-media information intelligent control selecting and compositing switch of the tourist guide information intelligent selecting and compositing system;

Step 201, transferring the multi-media tourist guide information to the audio and video signal to play for the user by the multi-media managing display subsystem.

In the tourism process, the system repeats the step 204 to 210.

During the step 206 to 210, the electronic map system transfers the real-time position coordinate to the position signal pattern on the electronic map and display on the electronic map.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A mobile multi-media intelligent tourist guide service system, comprising:

a GPS receiver, a GPS subsystem, a multi-media managing display subsystem, and an electronic map subsystem, wherein the system further comprises a mobile tourist guide service control subsystem, a trigger area network subsystem, and a tourist guide information intelligent selecting and compositing subsystem;

wherein said mobile tourist guide service control subsystem receives and processes position information from the GPS subsystem, produces multi-media tourist guide information in real-time, plays on said multi-media managing display subsystem, and controls said electronic map subsystem, wherein said mobile tourist guide service control subsystem produces the multi-media tourist guide information in real-time through:

extracting, by said trigger area network subsystem, tourist guide information; and judging, selecting and compositing, by said tourist guide information intelligent selecting and compositing subsystem, the tourist guide information, and wherein said mobile tourist guide service control subsystem controls said electronic map subsystem comprises:

said mobile tourist guide service control subsystem controls said electronic map subsystem to display a position in real-time, to record a track and to display corresponding geography information;

wherein said trigger area network subsystem pre-sets up a trigger area network, and pre-deploys tourist guide information in the trigger area network according to a scenery environment and a tourism order, wherein the tourism order comprises tourist eyesight, wherein the trigger area network is configured to coordinate the scenery environment with the tourist eyesight, wherein the trigger area network accounts for factors including: a landform and a geomorphy on the tourist eyesight;

wherein said tourist guide information intelligent selecting and compositing subsystem uses a status property and a process property to judge, select and composite the tourist guide information and gets the multi-media tourist guide information according to a tourist behavior;

wherein said status property is used for checking a tourist status, said process property is used for tracking a tourist visiting process, and said process property is determined through a process judgment according to a historical triggering result and said status property through said tourist guide information intelligent selecting and compositing subsystem, and is stored through said tourist guide information intelligent selecting and compositing subsystem;

wherein said historical triggering result comprises whether or not the tourist guide information has been triggered.

2. The mobile multi-media intelligent tourist guide service system, as recited in claim 1, wherein said multi-media managing display subsystem is used for playing audio, video, and image files.

3. The mobile multi-media intelligent tourist guide service system, as recited in claim 1, wherein said trigger area network subsystem sets up the trigger area network through determining positions, sizes, shapes and the number of trigger areas of the trigger area network such that real scenery, explanation and tourist eyesight are coordinated.

4. The mobile multi-media intelligent tourist guide service system, as recited in claim 1, wherein said trigger area network subsystem manages the tourist guide information deployed in the trigger area network through information type, language, nation, city, area, and title of the tourist guide information.

5. The mobile multi-media intelligent tourist guide service system, as recited in claim 1, wherein said process property comprises priority judgment, non-repeat judgment, exclusive judgment, and dependence judgment, wherein said process property has "and" and "or" relationships in between.

6. The mobile multi-media intelligent tourist guide service system, as recited in claim 1, wherein said status property comprises position status judgment, velocity judgment, moving direction judgment, road side judgment, and present time.

7. A method of providing a mobile multi-media intelligent tourist guide service, comprising:
   a) pre-profiling, by a trigger area network subsystem, a trigger area according to a human geography environment of a scenery;
   b) pre-forming, by the trigger area network subsystem, a trigger area network by all trigger areas;
   c) pre-deploying, by the trigger area network subsystem, tourist guide information units in a scenery information database according to a possible tourist order in the trigger area network, the tourism order comprising tourist eyesight, wherein the trigger area network is configured to coordinate the scenery environment with the tourist eyesight, wherein the trigger area network accounts for factors including: a landform and a geomorphy on the tourist eyesight;
   d) receiving, by a mobile tourist guide service control subsystem, a real-time position signal through a GPS subsystem from a global positioning satellite;
   e) transferring, by the mobile tourist guide service control subsystem, the real-time position signal to a real-time position coordinate and recording to a historical position coordinate aggregate;
   f) extracting, by the trigger area network subsystem, tourist guide information units from the scenery information database through the trigger area network based on the real-time position coordinate;
   g) calculating, by a tourist guide information intelligent selecting and compositing subsystem, a status property through a status judgment according to the real-time position coordinate and the historical position coordinate aggregate, wherein the status property is used for checking a tourist status;
   h) determining, by the tourist guide information intelligent selecting and compositing subsystem, a process property through a process judgment according to a historical triggering result and the status property, wherein the process property is used for tracking a tourist visiting process, wherein the historical triggering result comprises whether or not the tourist guide information units have been triggered; and storing, by the tourist guide information intelligent selecting and compositing subsystem, the process property;
   i) selectively compositing, by the tourist guide information intelligent selecting and compositing subsystem, the tourist guide information units according to the status property and the process property, and producing real-time multi-media tourist guide information; and
   j) transferring, by the mobile tourist guide service control subsystem, the real-time multi-media tourist guide information to audio and video signals to play, and displaying a position in real-time, recording a track and displaying corresponding geography information for a user;
   k) repeating steps d) to j) during a tour.

8. The method of providing a mobile multi-media intelligent tourist guide service, as recited in claim 7, wherein said status judgment comprises a position status judgment, a velocity range judgment, a moving direction judgment, and a road side judgment, and present time.

9. The method of providing a mobile multi-media intelligent tourist guide service, as recited in claim 7, wherein said process judgment comprises a priority judgment, an exclusive judgment, a non-repeat judgment, and a dependence judgment.

* * * * *